(12) United States Patent
Nicklisch et al.

(10) Patent No.: US 7,487,516 B1
(45) Date of Patent: Feb. 3, 2009

(54) DESKTOP COMPOSITION FOR INCOMPATIBLE GRAPHICS APPLICATIONS

(75) Inventors: Fred D. Nicklisch, Wuerselen (DE); Colin D. C. McCartney, Seattle, WA (US)

(73) Assignee: NVIDIA Corporation, Santa Clara, CA (US)

( * ) Notice: Subject to any disclaimer, the term of this patent is extended or adjusted under 35 U.S.C. 154(b) by 550 days.

(21) Appl. No.: 11/195,539

(22) Filed: Aug. 1, 2005

Related U.S. Application Data

(60) Provisional application No. 60/683,953, filed on May 24, 2005.

(51) Int. Cl.
G06F 3/00 (2006.01)
G06F 9/44 (2006.01)
G06F 9/46 (2006.01)
G06F 13/00 (2006.01)

(52) U.S. Cl. ...................... 719/328; 715/249
(58) Field of Classification Search ................. 719/322, 719/328, 323; 715/239, 249
See application file for complete search history.

(56) References Cited

U.S. PATENT DOCUMENTS

| | | | | |
|---|---|---|---|---|
| 6,044,408 A * | 3/2000 | Engstrom et al. | ........... | 719/328 |
| 6,711,624 B1 * | 3/2004 | Narurkar et al. | ............ | 719/321 |
| 6,831,635 B2 * | 12/2004 | Boyd et al. | .................. | 345/418 |
| 6,992,668 B2 * | 1/2006 | Gosalia et al. | .............. | 345/419 |
| 7,219,352 B2 * | 5/2007 | Estrop | ......................... | 719/323 |
| 2002/0169897 A1 * | 11/2002 | Gosalia et al. | .............. | 709/328 |
| 2003/0195998 A1 * | 10/2003 | Estrop | ......................... | 709/323 |
| 2004/0135974 A1 * | 7/2004 | Favalora et al. | ............... | 353/10 |
| 2004/0179262 A1 * | 9/2004 | Harman et al. | .............. | 359/462 |
| 2005/0193396 A1 * | 9/2005 | Stafford-Fraser et al. | .... | 719/328 |
| 2005/0248794 A1 * | 11/2005 | Shoen | ........................ | 358/1.13 |
| 2005/0283828 A1 * | 12/2005 | Perley et al. | ................... | 726/4 |
| 2006/0080677 A1 * | 4/2006 | Louie | ......................... | 719/323 |

\* cited by examiner

Primary Examiner—Meng-Ai An
Assistant Examiner—KimbleAnn Verdi
(74) Attorney, Agent, or Firm—Patterson & Sheridan, L.L.P.

(57) ABSTRACT

A first graphics application produces surface data using a first graphics applications programming interface. A second graphics application uses a second graphics applications programming interface that is incompatible with the first graphics applications programming interface to process the surface data for display. A device driver requests driver level information from the second graphics application and stores the surface data in a portion of memory specified by the driver level information. Although the first graphics application is incompatible with the second graphics application, surface data produced by the first graphics application may be processed for display by the second graphics application.

20 Claims, 4 Drawing Sheets

DESKTOP COMPOSITION FOR INCOMPATIBLE GRAPHICS APPLICATIONS

CROSS-REFERENCE TO RELATED APPLICATIONS

This application claims benefit of from commonly owned United States provisional patent application Ser. No. 60/683, 953, titled "Desktop Composition For Incompatible Graphics Applications," filed May 24, 2005, having common inventors as this application, which is herein incorporated by reference.

BACKGROUND OF THE INVENTION

Field of the Invention

Embodiments of the present invention generally relate to computer graphics, and more particularly to displaying surface data using a graphics application that is incompatible with the graphics application that was used to produce the surface data.

Description of the Related Art

The Microsoft Desktop Composition engine uses the Microsoft DirectX® application programming interface (API), such as Direct3D®, to performing compositing operations to combine surfaces for display. Each surface may be a window including rendered two dimensional (2D) or three dimensional graphics (3D) primitives or video. Surfaces produced using a DirectX® API, such as Direct3D®, may be processed by the Desktop Composition Engine. Surfaces produced using the OpenGL® shading language API cannot be processed using the Desktop Composition Engine. OpenGL® is an industry standard API that is used to produce images (surfaces) including 3D primitives.

Accordingly, there is a desire to enable the Desktop Composition Engine to display surfaces produced using the OpenGL® API.

SUMMARY OF THE INVENTION

The current invention involves new systems and methods for enabling a first graphics application that is incompatible with a second graphics application to produce surface data that may be processed by the second graphics application. The first graphics application produces the surface data using a first graphics application programming interface. The second graphics application uses a second graphics application programming interface that is incompatible with the first graphics application programming interface to process the surface data for display. A device driver requests access to a driver level representation of the surface. Specifically, the device driver requests driver level information, e.g., a unique identifier (ID) and a format description, from the second graphics application and stores the surface data in a portion of memory specified by the unique identifier. The unique ID is the "name" of the surface given by an operating system and is needed to gain access to the other driver's surface. The format description is needed to determine now to convert the data when the data is copied from the first application to the second application's surface. Although the first graphics application is incompatible with the second graphics application, surface data produced by the first graphics application may be processed for display by the second graphics application.

Various embodiments of a method of the invention for enabling use of surface data produced by a first graphics application by a second graphics application include requesting driver level information from the second graphics application and storing the surface data produced by the first graphics application in a portion of memory specified by the driver level information.

Various embodiments of a computer-readable medium containing a program which, when executed by a processor, performs a process of the invention for enabling use of surface data produced by a first graphics application by a second graphics application, including requesting driver level information from the second graphics application and storing the surface data produced by the first graphics application in a portion of memory specified by the driver level information.

Various embodiments of the invention includes a graphics processing system for producing the surface data or processing the surface data to produce additional surface data.

BRIEF DESCRIPTION OF THE DRAWINGS

So that the manner in which the above recited features of the present invention can be understood in detail, a more particular description of the invention, briefly summarized above, may be reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

When a graphics surface is produced using an API that is not compatible with a DirectX® API, the surface may not be processed or displayed using the Desktop Composition Engine. For example, surfaces produced using by the OpenGL® API cannot be displayed using the Desktop Composition Engine. A new function call is provided that, when executed by a device driver, obtains driver level information, including a unique identifier (resource handle) for a portion of memory allocated using the Direct® API. The new function call stores the surface data in the portion of memory that is accessible by the DirectX® API. The DirectX® API may then be used to process and display the surface. The device driver enables a unique identifier used by driver based on a first API to be visible by a driver based on a second API, where the second API is incompatible with the first API.

Figure 1:
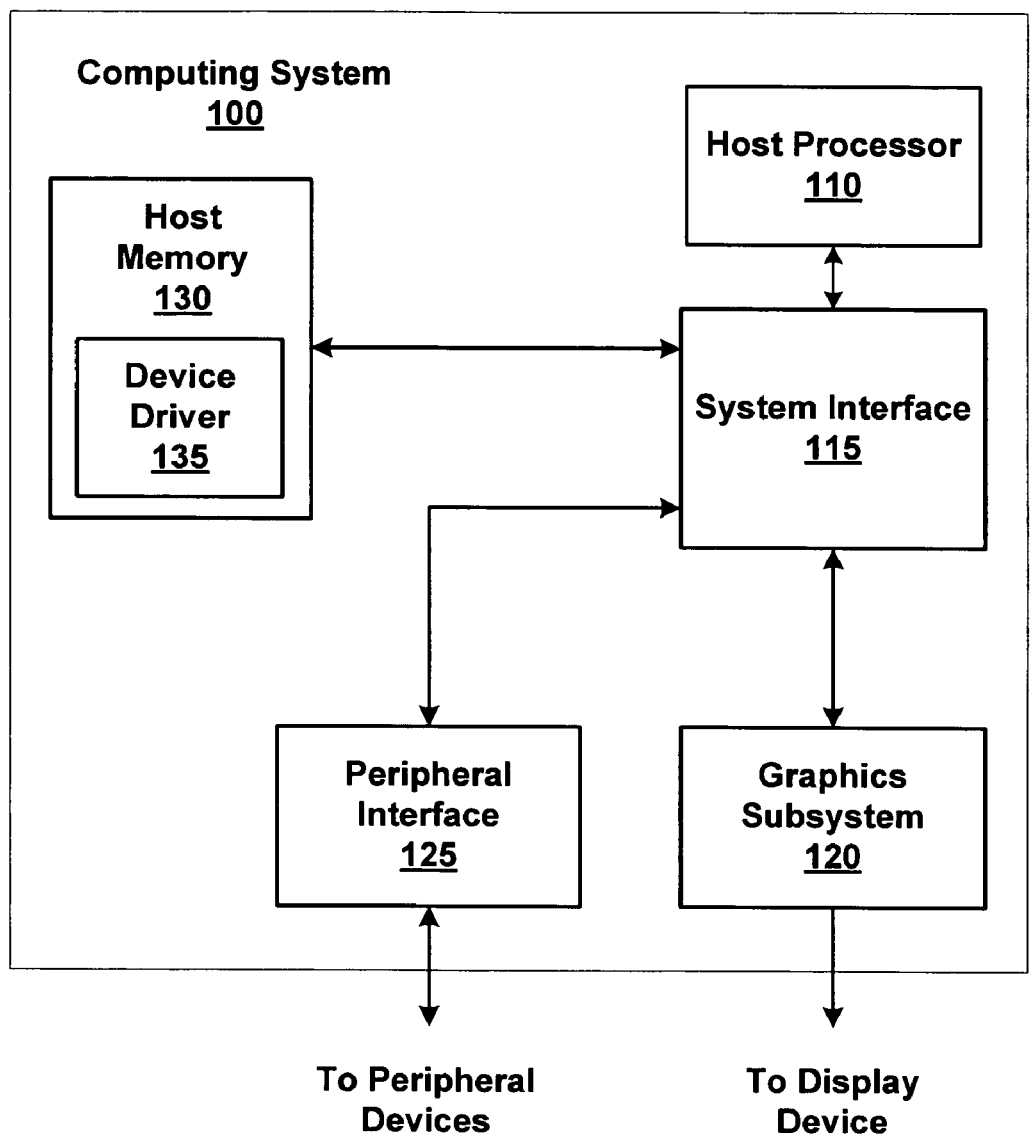
FIG. 1 is a block diagram of an exemplary embodiment of a respective computer system, including a host computer and a graphics subsystem, in accordance with one or more aspects of the present invention.

FIG. 1 is a block diagram of an exemplary embodiment of a respective computing system 100, including a central processing unit (CPU), host processor 110 and a graphics subsystem 120, in accordance with one or more aspects of the present invention. Computing system 100 may be a desktop computer, server, laptop computer, palm-sized computer, tablet computer, game console, portable wireless terminal such as a personal digital assistant (PDA) or cellular telephone, computer based simulator, or the like. Host processor 110 may include a system memory controller to interface directly to host memory 130 or may communicate with host memory 130 through a system interface 115 (as shown). Host processor 110 may run an operating system (not shown), such as Microsoft Windows®, that is stored in host memory 130. System interface 115 may be in I/O (input/output) interface or a bridge device including the system memory controller to interface directly to host memory 130. An example of system interface 115 known in the art includes intel® Northbridge.

System interface 115 may interface with a peripheral interface 125 and a graphics subsystem 120. Graphics system 120 may include one or more programmable graphics processors and dedicated local memory. Program instructions for execution by graphics subsystem 120 may be stored in host memory 130, as described in conjunction with FIG. 2A. A graphics device driver, device driver 135, interfaces between processes executed by host processor 110, such as graphics application programs, and graphics subsystem 120, translating program instructions as needed for execution by graphics subsystem 120. Device driver 135 may also exchange information between DirectX® API based graphics applications and other graphics applications, including those based on the OpenGL® API, to enable surfaces to be processed and/or displayed using the DirectX® API based Desktop Composition Engine. Graphics subsystem 120 may process program instructions from DirectX® API based graphics applications and other graphics applications, including those based on the OpenGL® API.

Graphics subsystem 120 may store surface data in graphics memory, such as the dedicated local memory, in host memory 130, or in a storage resource coupled to peripheral interface 125, such as a disk drive, network storage device, or the like. Graphics subsystem 120 may also output surface data for display on one or more display devices. The surface data may be produce using the DirectX® API based Desktop Composition Engine.

Figure 2A:
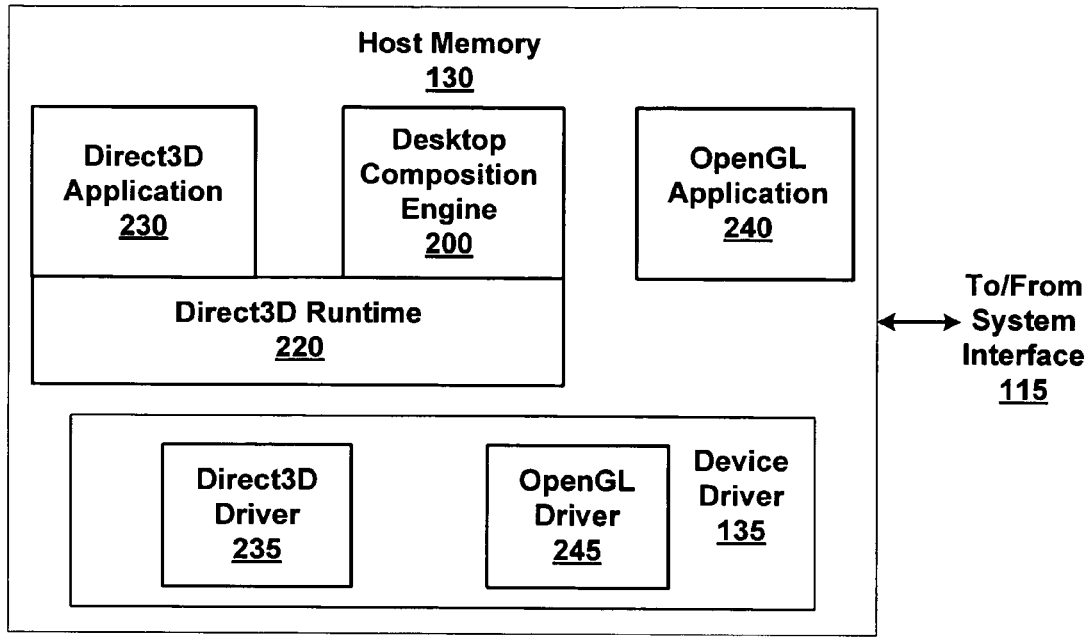
FIG. 2A is a block diagram of an exemplary embodiment of the host memory from FIG. 1 in accordance with one or more aspects of the present invention.

FIG. 2A is a block diagram of an exemplary embodiment of host memory 130 from FIG. 1, including device driver 135, in accordance with one or more aspects of the present invention. Device driver 135 within host memory 130 includes a Direct3D® driver 235 and an OpenGL® driver 245. In other embodiments of the present invention, device driver 135 may include other API specific drivers. Host memory 130 may also include one or more application programs, such as a Direct3D® graphics application 230, desktop composition engine 200, and OpenGL® application 240. Direct3D® graphics application 230, desktop composition engine 200, and OpenGL® application 240 may each be executed by host processor 110. Direct3D® graphics application 230 and desktop composition engine 200 are both based on the Direct3D® API and communicate with a Direct3D® Runtime 220 dynamic link library. In contrast, OpenGL® application 240 is based on the OpenGL® API and does not directly communicate with Direct3D® Runtime 220.

Direct3D® driver 235 and OpenGL® driver 245 are each configured to interface between corresponding graphics applications and graphics subsystem 120 and are typically specific to the vendor of graphics subsystem 120. As previously described, device driver 135 may be used to translate program instructions received from Direct3D® graphics application 230 or desktop composition engine 200 via Direct3D® Runtime 220 or from OpenGL® driver 245 for execution by graphics subsystem 120. In other embodiments of the present invention, additional graphics applications and corresponding drivers may be stored in host memory 130. The operating system provides device drivers, such as Direct3D® driver 235 and OpenGL® driver 245 with unique IDs for surfaces. The unique ID and a format description are included in driver level information for each surface. The driver level information may also include other surface characteristics, such as color, size, width, or the like. Device driver 135 enables the exchange of driver level information for surfaces between Direct3D® driver 235 and OpenGL® driver 245, permitting Direct3D® driver 235 to access an Open GL® surface and permitting OpenGL® driver 245 to access a Direct 3D® surface.

Figure 2B:
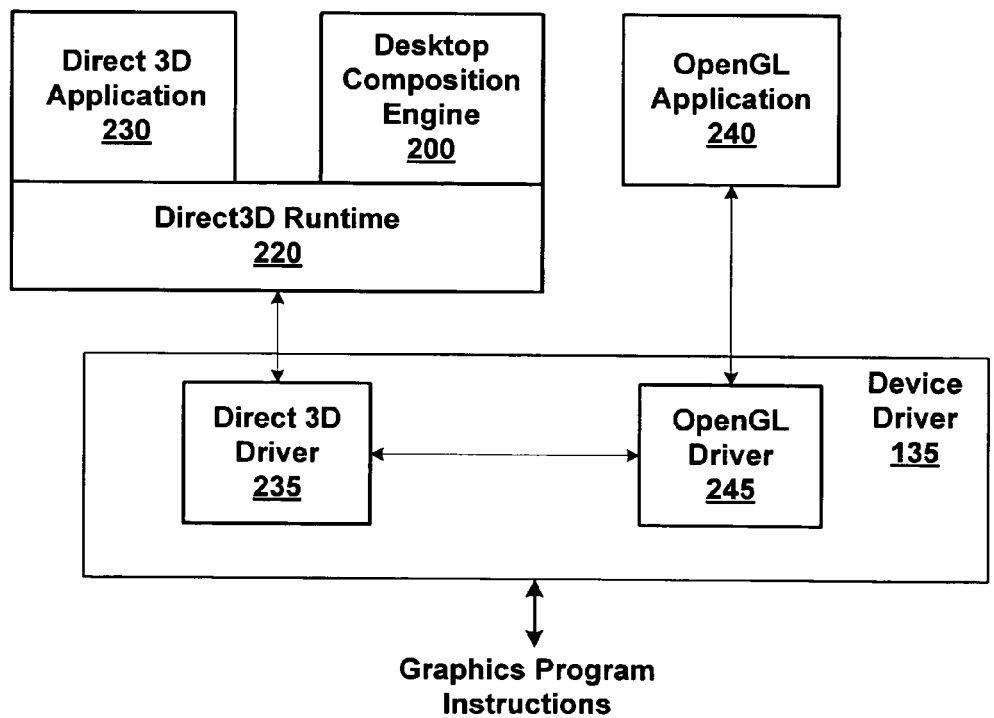
FIG. 2B illustrates a conceptual diagram of the contents of the host memory in accordance with one or more aspects of the present invention.

FIG. 2B illustrates a conceptual diagram of the contents of host memory 130 in accordance with one or more aspects of the present invention. As previously described, each graphics application, Direct3D® application 230, desktop composition engine 200, or OpenGL® application 240 may produce instructions for execution by graphics subsystem 120. Surface data, such as a rendered 3D graphics scene, produced by OpenGL® application 240 is stored in an OpenGL® surface that may be located in graphics memory, i.e., local dedicated memory within graphics subsystem 120 or in host memory 130. The operating system provides OpenGL® driver 245 with a resource handle that is a unique identifier for the OpenGL® surface and is used to access the surface data. Similarly, surface data produced by Direct3D® application 230 is stored in a Direct3D® surface that may be also be located in graphics memory. The operating system provides Direct3D® driver 235 with a resource handle that is also a unique identifier for the Direct3D® surface and is used to access the surface data.

Because the OpenGL® surfaces and the Direct3D® surfaces are in different memory namespaces, the data in each surface cannot be directly accessed by an incompatible graphics application, such as Direct3D® application 230 and OpenGL® application 240, respectively. Furthermore, because desktop composition engine 200 is based on the Direct3D® API, desktop composition engine 200 cannot directly access surface data in an OpenGL® surface. As described in conjunction with FIGS. 3A, 3B, and 3C, OpenGL® Driver 245 may communicate with Direct3D® Driver 235 to obtain driver level information for a Direct3D® surface and exchange surface data between incompatible graphics applications. OpenGL® Driver 245 may behave as a graphics application based on the Direct3D® API and store surface data in a Direct3D® surface corresponding to the driver level information. The Direct3D® surface can then be displayed using graphics applications based on the Direct3D® API, such as desktop composition engine 200.

Figure 3A:
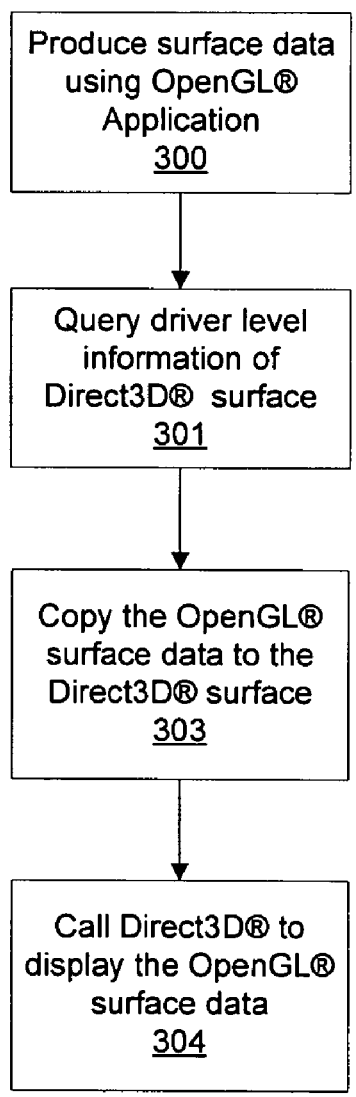
FIGS. 3A, 3B, and 3C illustrate embodiments of methods for using surface data produced by incompatible APIs in accordance with one or more aspects of the present invention.

FIG. 3A illustrates an embodiment of a method for using surface data produced by incompatible APIs in accordance with one or more aspects of the present invention. In step 300 surface data is produced by a graphics application that is not based on a DirectX® API, such as OpenGL® application 240. To produce the surface data, OpenGL® driver 245 may provide graphics program instructions to graphics subsystem 120. The surface data is then stored in a portion of graphics memory indicated by an OpenGL® surface. In step 301 OpenGL® driver 245 behaves as a Direct3D® application and queries the Direct3D® driver 235 to obtain driver level information (including a resource handle) of a Direct3D® surface. As previously described, the driver level information may also include a format description and other surface characteristics.

In some embodiments of the present invention a function may be used to perform step 301. The code shown in Table 1 represents such a function that may be part of OpenGL® driver 245. The function calls into a DirectX® driver, such as Direct3D® driver 235 and returns DirectX® surface information including the driver level information. The Direct3D® surface is accessible by direct3D® driver 235. When the driver level information is a provided to OpenGL® driver 245, OpenGL® driver 245 may then access the portion of graphics memory specified by the driver level information. In some embodiments of the invention the surface information may also include the surface width, height, size, or the like. By way of illustration, the code is defined using C. However, any other language may be used to define the function.

TABLE 1

```
// returns TRUE and pQueryResource is valid
static BOOL IhglDirectXQueryDataFromD3dum(
    IN    LHGL_DEVICE_DATA         *pDeviceData,
    OUT NVL_PRIV_D3DOGL_QUERYOGLRESOURCE *pQueryResource)
{
  BOOL bRet = FALSE;
  IDirect3DDevice8_GetInfo(pDeviceData->pD3dDevice,
       NVL_DEVINFO_ID_QUERYOGLRESOURCE, pQueryResource,
       sizeof(NVL_PRIV_D3DOGL_QUERYOGLRESOURCE));
  // validate received surface information
  if (
(NVL_PRIV_D3DOGL_QUERYOGLRESOURCE_CHECK(pQueryResource))
     && (pQueryResource->Type ==
NVL_PRIV_D3DOGL_QUERYOGLRESOURCE_TYPE_RETURN_HANDLE))
    {
      bRet = TRUE;
    }
  return bRet;
}
```

The function included in OpenGL® driver 245 and the function called within Direct3D® driver 235 may be private and not visible through the OpenGL® API through the Direct3D® API. In some embodiments of the present invention such private functions are accessed via the operating system, i.e., requesting an address corresponding to the private function.

In some embodiments of the present invention OpenGL® driver 245 sets up a second OpenGL® surface using the driver level information (including the DirectX® resource handle) received in step 301. The second OpenGL® surface is used to store the surface data. In one embodiments of the present invention, other techniques, known to those skilled in the art, are used to store the surface data.

In step 303 OpenGL® driver 245 copies the surface data from a first portion of graphics memory that is accessible by the OpenGL® API based graphics application to the OpenGL® surface that specifies a second portion of graphics memory that is accessible by the DirectX® API based graphics application. The driver level information may be used to convert the surface data when it is copied from the first portion of graphics memory to the second portion of graphics memory. The second portion of graphics memory is a DirectX® surface specified by the driver level information. In some embodiments of the present invention the code shown in Table 2 may be used to perform step 303, where srcView points to an OpenGL® surface, including the OpenGL® surface's driver level information. Likewise, dstView points to a DirectX® surface, including the DirectX® surface's driver level information. By way of illustration, the code is defined using C. However, any other language may be used to define the code.

TABLE 2

```
nvOpaqueBlit(
       srcView,      // src buffer = OpenGL
       &dstView);    // dst buffer = DirectX
```

In step 304 OpenGL® driver 245 calls the DirectX® API in the same manner as a graphics application based on the Direct3D® API, such as Direct3D® application 230 or Desktop Composition Engine 200, does to display surface data. In some embodiments of the present invention the function call shown in Table 3 may be used to perform step 304, where hwnd is the resource handle of the window on the desktop, including position, size, and the like. By way of illustration, the code is defined using C. However, any other language may be used to define the function.

TABLE 3

```
IDirect3DDevice8_Present(pDeviceData->pD3dDevice, NULL, NULL,
hwnd, NULL);
```

Figure 3B:
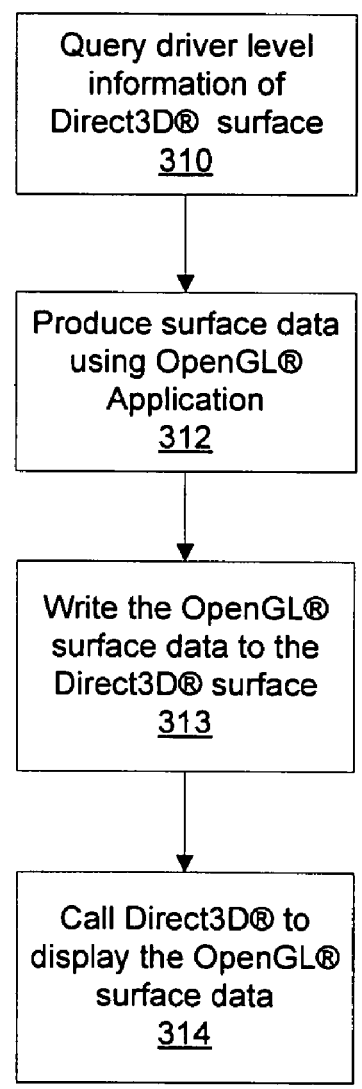

FIG. 3B illustrates another embodiment of a method for using surface data produced by incompatible graphics APIs in accordance with one or more aspects of the present invention. In this embodiment of the present invention, the driver level information is obtained prior to producing the surface data. In step 310 OpenGL® driver 245 queries a DirectX® driver, such as Direct3D® driver 235 to obtain driver level information (including a resource handle) of a DirectX® surface. In other embodiments of the present invention, another driver that, like OpenGL® driver 245, is based on a graphics API that is incompatible with a DirectX® API is used in place of OpenGL® driver 245. The function described in conjunction with step 301 of FIG. 3A may be used to perform the query in step 310.

In step 312 surface data is produced by a graphics application that is not based on the DirectX® API, such as OpenGL® application 240. In one embodiment of the present invention, the surface data is stored in a portion of graphics memory specified by a first OpenGL® surface, and in step 313, the surface data is copied from the portion of graphics memory specified by the first OpenGL® surface to the portion of graphics memory specified by the OpenGL® surface (Direct3D® resource handle) received in step 310. In another embodiment of the present invention, the surface data is written to the portion of graphics memory specified by the OpenGL® surface (Direct3D® resource handle) received in step 310 as the surface data is produced. Step 314 corresponds to step 304 and is performed as previously described in conjunction with FIG. 3A.

Figure 3C:
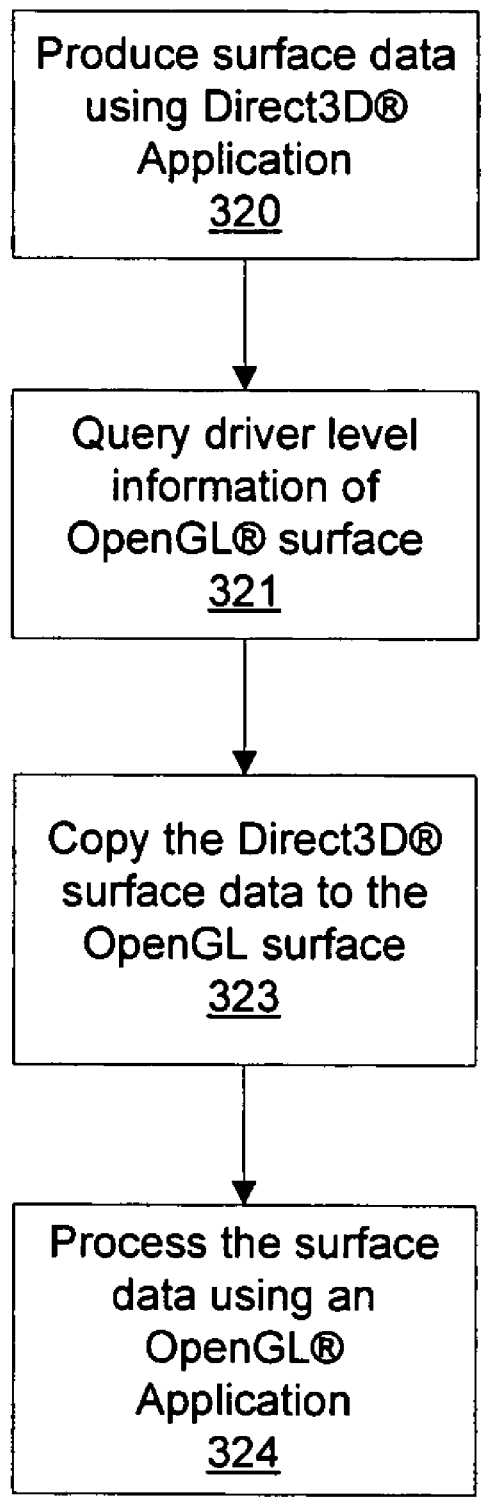

FIG. 3C illustrates yet another embodiment of a method for using surface data produced by incompatible graphics APIs in accordance with one or more aspects of the present invention. In this embodiment of the present invention, surface data produced by a graphics application based on the DirectX® API is provided to an incompatible graphics application that is not based on a DirectX® API. For example, video image data received or produced by Direct X® may be provided to a graphics application based on the OpenGL® API, such as OpenGL® application 240. OpenGL® application 240 may use the surface data as a texture map to produce additional surface data, such as an image rendered using the texture map. The additional surface data may then be processed or displayed using another graphics application. The methods described in conjunction with FIGS. 3A and 3B may be used to process or display the additional surface data using a graphics application based on the DirectX® API.

In step 320 surface data is produced by a graphics application that is based on a DirectX® API, such as Direct3D® application 230 or desktop composition engine 200. To produce the surface data, Direct3D® driver 235 may provide graphics program instructions to graphics subsystem 120. The surface data is then stored in a portion of graphics memory indicated by a DirectX® resource handle. In step 321 Direct3D® driver 235 queries OpenGL® driver 245 to obtain driver level information (OpenGL® surface) of an OpenGL® surface. In step 323 the Direct3D® surface data is copied to the OpenGL® surface. In step 324 the incompatible graphics application, such as OpenGL® application 240 may process the surface data provided by the DirectX® API based graphics application via Direct3D® driver 235.

Persons skilled in the art will appreciate that any system configured to perform the method steps of FIGS. 3A, 3B, and 3C or their equivalents, is within the scope of the present invention. The methods shown in FIGS. 3A, 3B, and 3C may be used to exchange surface data between graphics applications based on incompatible graphics APIs. The exchanged surface data may be processed or displayed using the different graphics applications. Driver level information used by drivers of incompatible APIs, such as Direct3D® driver 235 and OpenGL® driver 245, are made visible to each other, enabling the exchange of the surface data between graphics applications based on the incompatible APIs.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of utilizing surface data produced by a first graphics application by a second graphics application, wherein a first application programming interface used by the first graphics application is incompatible with a second application programming interface used by the second graphics application, the method comprising:
   storing the surface data in a first portion of memory;
   requesting driver level information from the second graphics application;
   storing the surface data produced by the first graphics application in a second portion of memory specified by the driver level information, wherein the driver level information includes a unique identifier (ID) and a format description,
      the unique ID identifying a region in the memory storing the surface data and required by the second graphics application to access the stored surface data, and
      the format description determining how to convert the surface data from a format compatible with the first graphics application to a format compatible with the second graphics application; and
   moving the data from the first portion of memory to the second portion of the memory after reading the format and the unique ID.

2. The method of claim 1, wherein the first and second portions of memory are included in host memory.

3. The method of claim 1, wherein the first application programming interface is provided the unique ID by an operating system configured to generate and provide a resource handle on the unique ID.

4. The method of claim 1, wherein the first application programming interface includes the driver level information configured to operate as a graphics application.

5. The method of claim 1, further comprising processing three dimensional graphics primitives to produce the surface data.

6. The method of claim 1, wherein the surface data is video data, further comprising processing the video data using the second graphics application to produce additional surface data.

7. The method of claim 1, further comprising processing the surface data for display using the second graphics application.

8. The method of claim 1, further comprising reading the surface data from other driver level information that is specified by the first graphics application.

9. The method of claim 1, wherein the requesting is performed by a device driver initiating a function call through an operating system that returns the driver level information to the device driver.

10. A computer-readable medium containing a program which, when executed by a processor, performs a process utilizing surface data produced by a first graphics applications programming interface by a second graphics applications, wherein a first application programming interface used by a first graphics application is incompatible with a second application programming interface used by a second graphics application, the process comprising:
   storing the surface data in a first portion of memory;
   requesting driver level information from the second graphics applications programming interface;
   storing the surface data produced by the first graphics applications programming interface in a second portion of memory specified by the driver level information, wherein the driver level information includes a unique identifier (ID) and a format description,
      the unique ID identifying a region in the memory storing the surface data and required by the second graphics application to access the stored surface data, and
      the format description determining how to convert the surface data from a format compatible with the first graphics application to a format compatible with the second graphics application; and moving the surface data from the first portion of memory to the second portion of the memory after reading the format and the unique ID.

11. The computer-readable medium of claim 10, wherein the first and second portions of memory are included in host memory.

12. The computer-readable medium of claim 10, further comprising processing three dimensional graphics primitives to produce the surface data.

13. The computer-readable medium of claim 10, wherein the surface data is video data, and further comprising processing the video data using the second graphics application to produce additional surface data.

14. The computer-readable medium of claim 10, further comprising processing the surface data for display using the second graphics application.

15. The computer-readable medium of claim 10, wherein the second graphics application is a desktop compositing engine application using an application programming interface.

16. The computer-readable medium of claim 10, further comprising reading the surface data from other driver level information that is specified by the first graphics application.

17. The computer-readable medium of claim 10, wherein the requesting is performed by a device driver initiating a function call through an operating system that returns the driver level information to the device driver.

18. The method of claim 1, wherein the first graphics application calls the second graphics application.

19. The computer-readable medium of claim 10, wherein the first application programming interface is provided the unique ID by an operating system configured to generate and provide a resource handle on the unique ID.

20. The computer-readable medium of claim 10, wherein the first application programming interface includes the driver level information configured to operate as a graphics application.

* * * * *